United States Patent [19]

Charmat

[11] Patent Number: 5,360,086

[45] Date of Patent: Nov. 1, 1994

[54] DRUM BRAKE WITH CAM OPERATED PARKING BRAKE LEVER

[75] Inventor: Djamel Charmat, South Bend, Ind.

[73] Assignee: AlliedSignal Inc., Morristown, N.J.

[21] Appl. No.: 163,019

[22] Filed: Dec. 7, 1993

[51] Int. Cl.$^5$ .............................................. F16D 65/56
[52] U.S. Cl. ................................... 188/79.54; 188/326
[58] Field of Search ............. 188/79.51, 79.54, 79.55,
188/79.59, 106; 74/516, 518, 110

[56] References Cited

U.S. PATENT DOCUMENTS

| | | | |
|---|---|---|---|
| 2,945,564 | 7/1960 | House et al. | 188/106 A |
| 3,709,334 | 1/1973 | Kondo et al. | 188/79.54 |
| 4,079,819 | 3/1978 | Shirai et al. | 188/79.54 |
| 4,387,792 | 6/1983 | Imamura | 188/331 |
| 5,042,623 | 8/1991 | Yamamoto | 188/79.51 |

*Primary Examiner*—Robert J. Oberleitner
*Assistant Examiner*—Chris Schwartz
*Attorney, Agent, or Firm*—Larry J. Palguta; Leo H. McCormick, Jr.

[57] ABSTRACT

The drum brake (10) comprises a backing plate (11) having an anchor block (15) and shoe retainer (17) attached thereto, a parking brake lever (40) connected with one (14) of a pair of drum brake shoes (12, 14), a first pair of drum brake shoe ends (16, 18) engaging an actuation mechanism (20) and a second pair of drum brake shoe ends (22, 24) engaging the anchor block (15). A cam mechanism (50) is attached pivotally to the backing plate (11) and extends transversely relative to the plane of the backing plate (11). A parking brake cable (72) extends through an opening (25) in the backing plate (11) and is connected with the cam mechanism (50) and a second, shorter cable (70) extends between the cam mechanism (50) and an end (42) of the parking brake lever (40). Retraction of the parking brake cable (72) effects a greater displacement of the shorter cable (70) and parking brake lever (40) to effect a parking brake application.

10 Claims, 3 Drawing Sheets

DRUM BRAKE WITH CAM OPERATED PARKING BRAKE LEVER

The present invention relates generally to a drum brake having a parking brake lever, and in particular to a parking brake lever displaced by a cam mechanism attached pivotally to the backing plate.

Drum brakes have been utilized on vehicles for decades. With the advent of front wheel disc brakes, drum brakes have been relegated to braking of the rear wheels, and if rear disc brakes are utilized for service braking, an associated drum brake could be utilized for a parking brake application. In drum brakes that are utilized for both service and parking brake applications, it is typical for the drum brake to include a parking brake lever attached pivotally to one drum brake shoe and engaging a strut or wear adjuster while an opposite end of the parking brake lever is connected with the parking brake cable. It is highly desirable to reduce the amount of parking brake cable load required for actuation of the parking brake. By reducing the parking brake cable load, the parking brake cables, foot or hand controls, brackets and other hardware associated with the parking brake system can be downsized so that they weigh less and cost less. Additionally, if the parking brake cable load can be reduced-and a shorter cable travel provided while the parking application force effected by the drum brake shoes is increased via the parking brake lever, the drum brake could utilize lining material having a lower static coefficient of friction. Because a greater parking load is effected by the drum brake, the lower static coefficient of friction linings may be utilized and this further reduces cost. It is highly desirable that such improvements be provided without making major design changes in the drum brake.

The present invention provides solutions to the above by providing a drum brake, comprising a backing plate supporting actuation means for a pair of drum brake shoes, the actuation means disposed between a first pair of brake shoe ends, a second pair of brake shoe ends engaging abutment means, a parking brake lever connected with one of said drum brake shoes and engaging strut means extending between the first pair of brake shoe ends, a cam mechanism attached pivotally to the backing plate adjacent the abutment means and extending transversely to said backing plate, the backing plate having an opening through which extends cable means connected with said cam mechanism, and attachment means extending from said cam mechanism to an associated end of the parking brake lever, such that displacement of said cable means effects rotatable displacement of the cam mechanism and displacement of the attachment means and parking brake lever wherein the end of the parking brake lever travels a greater distance than a displacement distance of said cable means.

One way of carrying out the invention is described in detail below with reference to the drawings which illustrate a specific embodiment in which.

Figure 1:
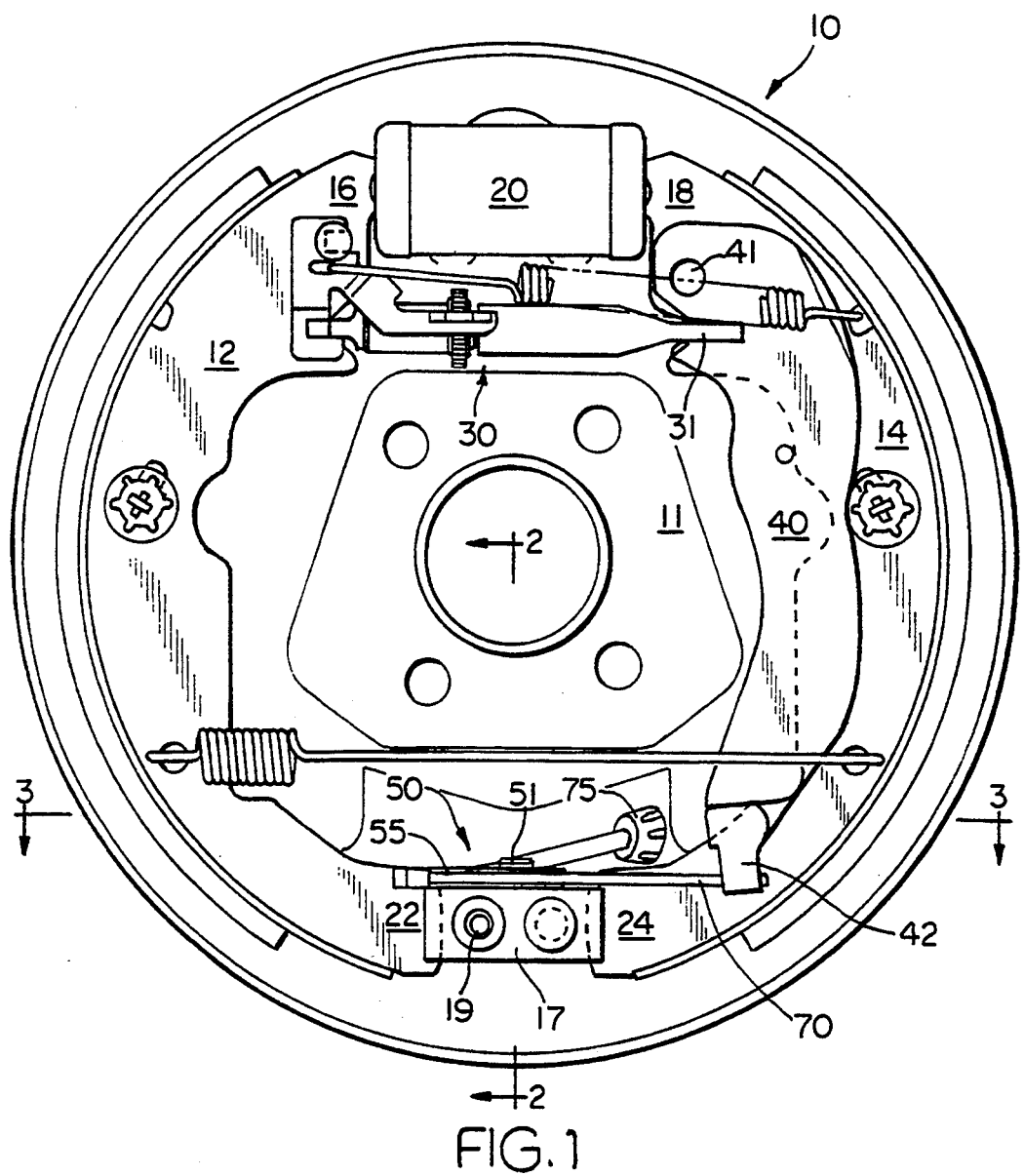
FIG. 1 is a view of a drum brake utilizing therein the present invention.
Figure 2:
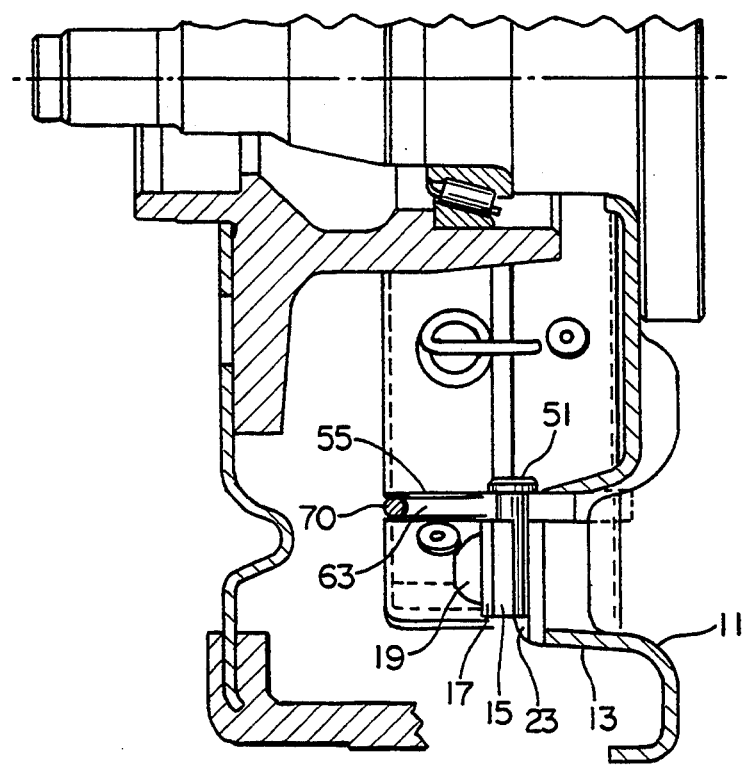
FIG. 2 is a section view taken along view line 2—2 of FIG. 1.
Figure 3:
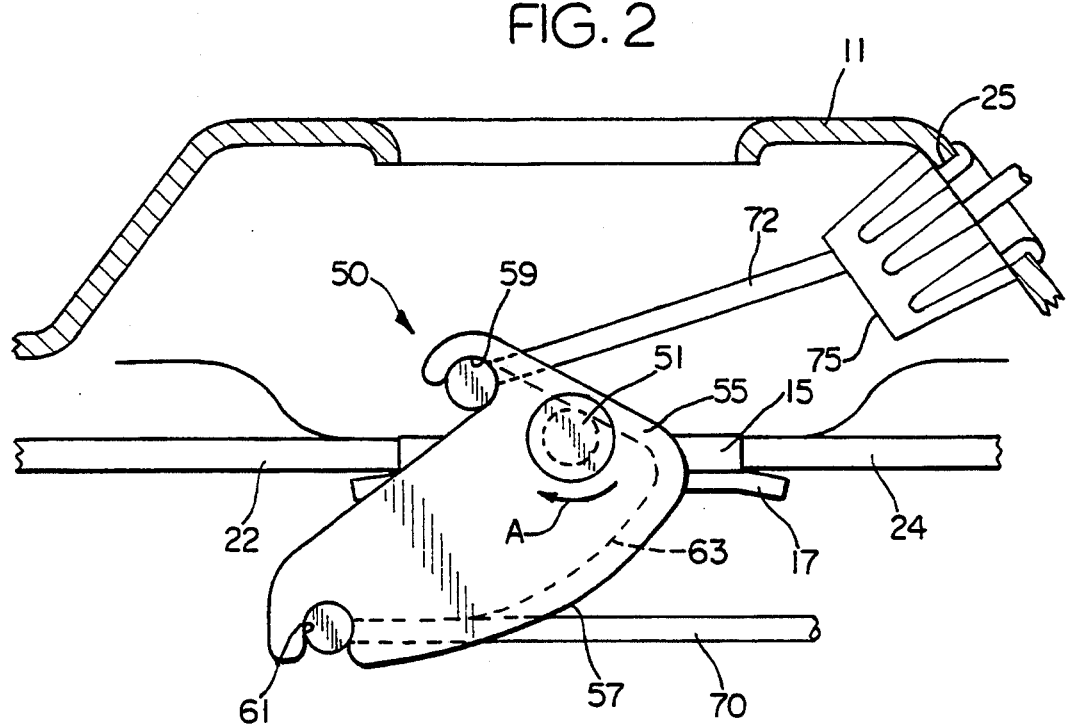
FIG. 3 is a section view taken along view line 3—3 of FIG. 1.
Figure 4:
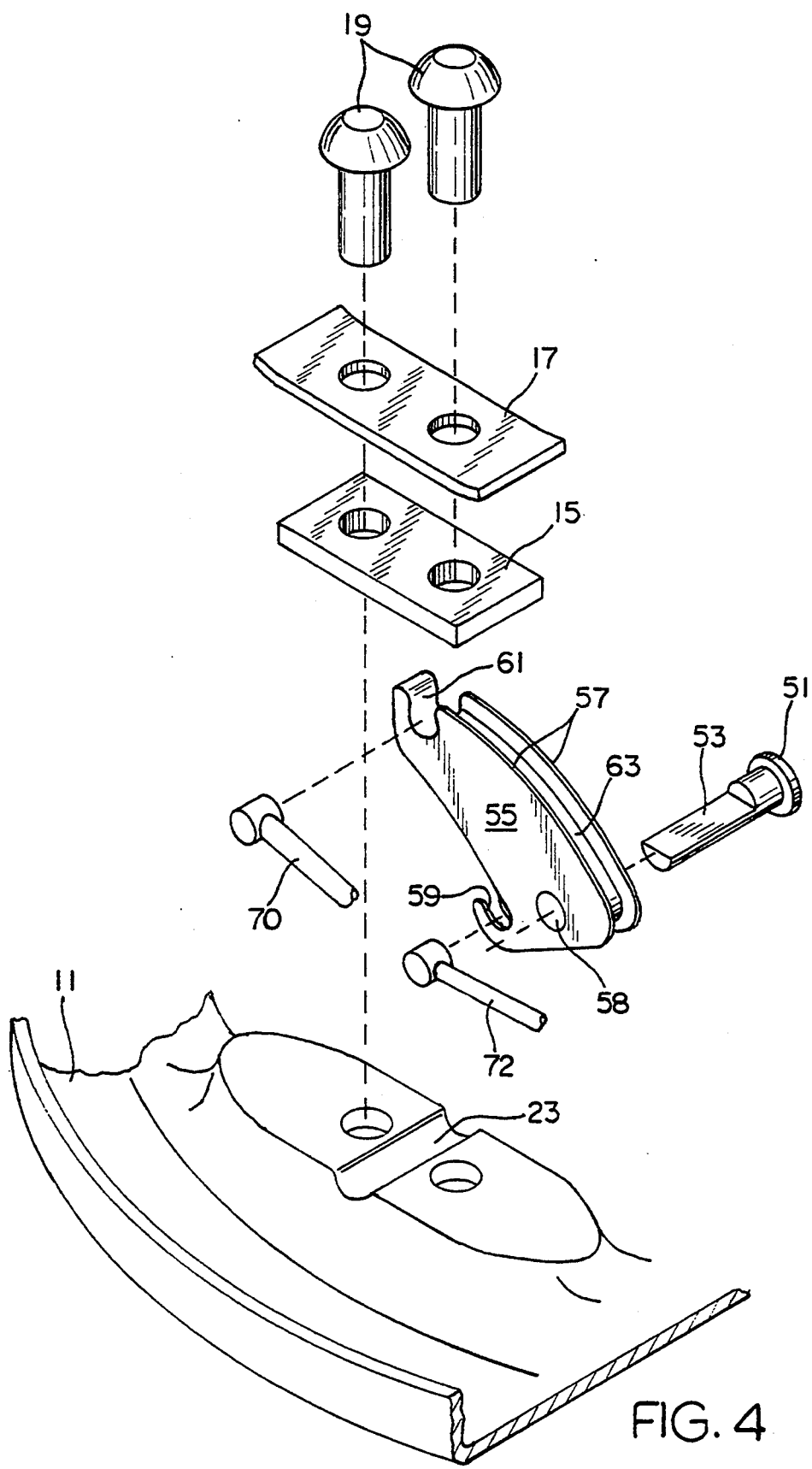
FIG. 4 is a partial exploded view of the cam mechanism of the present invention.

A drum brake utilizing the present invention is designated generally by reference numeral 10 in FIG. 1. Drum brake 10 includes a pair of drum brake shoes 12, 14 mounted on backing plate 11. Drum brake shoes 12 and 14 have a first pair of drum brake shoe ends 16 and 18 engaging wheel cylinder or actuation means 20. The first pair of drum brake shoe ends 16 and 18 have strut member or wear adjuster 30 extending therebetween with one end 31 of the strut also engaging parking brake lever 40 connected pivotally at pivot pin 41 with the web of brake shoe 14. The opposite end 42 of parking brake lever 40 is connected with a short cable or attachment means 70 connected with cam mechanism 50. Backing plate 11 includes axial extension 13 (see FIG. 2) having attached thereto anchor block 15 and brake shoe retainer 17 by means of rivets 19. A second pair of drum brake shoe ends 22 and 24 engage anchor block 15 and are retained axially in place by shoe retainer 17.

As illustrated in FIGS. 1-4, cam mechanism 50 is attached pivotally to backing plate 11 by pivot pin 51. Pivot pin 51 has reduced diameter flat portion 53 such that when pin 51 is received within backing plate recess 23 and anchor block 15 and shoe retainer 17 are connected to the backing plate by rivets 19, pin 51 is captured within recess 23. Cam member 55 includes a pair of oppositely disposed peripheral flanges 57 extending around a portion of the periphery of the mechanism, an opening 58 receiving pin 51, a first grooved inlet or slot 59, and a second grooved inlet or slot 61. The short cable or attachment means 70 extends between slot 61 and end 42 of parking brake lever 40. Parking brake cable 72 is received within grooved inlet or slot 59 and extends into parking brake plug 75 received within backing plate cable opening 25. Cam member 55 includes peripheral cable reception groove 63 formed between flanges 57. Groove 63 terminates near second grooved inlet or slot 59 so that cable 72 may extend between and through flanges 57.

Drum brake 10 provides a service brake application by hydraulic actuation of wheel cylinder or actuation means 20 which moves drum brake shoes 12 and 14 outwardly into engagement with a rotating drum. A parking brake application is effected by the vehicle operator operating a not shown foot or hand brake control which displaces parking brake cable 72 that effects rotation of cam member 55 in the direction A illustrated in FIG. 3. As cam member 55 rotates about pin 51, short cable 70 is displaced a much greater distance because of the shape of the cam member, and accordingly the parking brake lever end 42 is displaced the same greater distance. Displacement of parking brake lever 42 about pivot pin 41 causes displacement of strut member 30 and drum brake shoe 12, and by reaction, drum brake shoe 14 so that each extends outwardly and engages the drum to effect a parking brake application. Because of the shape of cam member 55, it is foreseen that a 13.3 millimeter travel of the parking brake cable 72 will produce a 20 millimeter travel of the short cable 70 and parking brake lever end 42. As cam member 55 is rotated, short cable 70 is received within reception groove 63 so that it wraps around a portion of cam member 55. At the end of the travel of parking brake cable 72 and short cable 70, there is a one-to-one ratio so that the parking brake cable load is equalized with that of the load at the end of the parking brake lever, the load at the end of the parking brake lever having previously been effected as a result of the high camming ratio.

Cam mechanism 50 of the present invention will effect a greater parking brake load application by the parking brake lever even though there would be a lesser amount of parking brake cable travel. As a result, the parking brake cables, foot or hand control, and brackets and other hardware associated with the parking brake system can be downsized because less force must be effected by those components. The result can be a significant cost saving. Additionally, because of the greater parking brake application force effected by the increased travel of the parking brake lever, a lining material having a low static coefficient of friction may be utilized, such friction material being more readily available and less costly. Finally, the present invention can be easily incorporated into non-servo floating shoe drum brakes without requiring any major design changes.

I claim:

1. A drum brake, comprising a backing plate supporting actuation means for a pair of drum brake shoes, the actuation means disposed between a first pair of brake shoe ends, a second pair of brake shoe ends engaging abutment means, a parking brake lever connected with one of said drum brake shoes and engaging strut means extending between the first pair of brake shoe ends, a cam mechanism attached pivotally to the backing plate adjacent the abutment means and extending transversely to said backing plate, the backing plate having an opening through which extends cable means connected with said cam mechanism, and attachment means extending from said cam mechanism to an associated end of the parking brake lever, such that displacement of said cable means effects rotatable displacement of the cam mechanism and displacement of the attachments means and parking brake lever wherein the shape of the cam mechanism causes the end of the parking brake lever to travel a greater distance than a displacement distance of said cable means.

2. The drum brake in accordance with claim 1, wherein the attachment means comprises a cable extending between the cam mechanism and the end of the parking brake lever.

3. The drum brake in accordance with claim 1, wherein said cam mechanism comprises a cam member having a pair of oppositely disposed peripheral flanges forming a groove which receives increasingly the attachment means as the cam mechanism is rotated in one direction.

4. The drum brake in accordance with claim 3, wherein the cam mechanism includes a slot opening communicating with said groove, such that the attachment means is received within the slot opening and extends through a portion of the groove.

5. The drum brake in accordance with claim 3, wherein the cam mechanism includes a pivot pin captured fixedly between said abutment means and backing plate.

6. The drum brake in accordance with claim 5, wherein the abutment means includes an anchor block and a shoe retainer connected to the backing plate by rivet means, the pivot pin received within a recess of the backing plate and captured between the backing plate and anchor block.

7. A drum brake, comprising a backing plate supporting actuation means for a pair of drum brake shoes, the actuation means disposed between a first pair of brake shoe ends, a second pair of brake shoe ends engaging abutment means, a parking brake lever connected with one of said drum brake shoes and engaging strut means extending between the first pair of brake shoe ends, a cam mechanism attached pivotally to the backing plate adjacent the abutment means and extending transversely to said backing plate, the abutment means including an anchor block and a shoe retainer connected to the backing plate by rivet means, a pivot pin of the cam mechanism received within a recess of the backing plate and captured between the backing plate and anchor block, the backing plate having an opening through which extends cable means connected with said cam mechanism, and attachment means extending from said cam mechanism to an associated end of the parking brake lever, such that displacement of said cable means effects rotatable displacement of the cam mechanism and displacement of the attachment means and parking brake lever wherein the shape of the cam mechanism causes the end of the parking brake lever to travel a greater distance than a displacement distance of said cable means.

8. The drum brake in accordance with claim 7, wherein said cam mechanism comprises a cam member having a pair of oppositely disposed peripheral flanges forming a groove which receives increasingly the attachment means as the cam mechanism is rotated in one direction.

9. The drum brake in accordance with claim 8, wherein the cam mechanism includes a slot opening communicating with said groove, such that the attachment means is received within the slot opening and extends through a portion of the groove.

10. The drum brake in accordance with claim 7, wherein the attachment means comprises a cable extending between the cam mechanism and the end of the parking brake lever.

* * * * *